US011334689B2

(12) United States Patent
Falk

(10) Patent No.: US 11,334,689 B2
(45) Date of Patent: May 17, 2022

(54) APPARATUS AND METHOD FOR OPERATING A SOFTWARE-CONFIGURED PROCESSING UNIT FOR A DEVICE

(71) Applicant: Siemens Aktiengesellschaft, Munich (DE)

(72) Inventor: Rainer Falk, Poing (DE)

(73) Assignee: SIEMENS AKTIENGESELLSCHAFT

( * ) Notice: Subject to any disclaimer, the term of this patent is extended or adjusted under 35 U.S.C. 154(b) by 313 days.

(21) Appl. No.: 16/507,507

(22) Filed: Jul. 10, 2019

(65) Prior Publication Data

US 2020/0019733 A1 Jan. 16, 2020

(30) Foreign Application Priority Data

Jul. 13, 2018 (EP) ..................................... 18183287

(51) Int. Cl.
*G06F 21/76* (2013.01)
(52) U.S. Cl.
CPC .................................. *G06F 21/76* (2013.01)
(58) Field of Classification Search
CPC ....................................................... G06F 21/76
USPC ............................................................ 726/34
See application file for complete search history.

(56) References Cited

U.S. PATENT DOCUMENTS 9,923,921 B1 * 3/2018 Grafi .......................... H04L 9/30
2011/0296440 A1 * 12/2011 Laurich ................... G06F 21/72
719/326

FOREIGN PATENT DOCUMENTS

EP 3185194 6/2017

OTHER PUBLICATIONS

Safety-Critical Smart Systems with Software Coded Processing Martin Süßkraut, SIListra Systems GmbH, Dresden, Germany on Jun. 11, 2015 Jörg Kaienburg, SIListra Systems GmbH, Dresden, Germany https://www.researchgate.net/publication/273351261; 2015.
Süßkraut, M. et al.; Safety-Critical Smart Systems with Software Coded Processing; Conference: Smart Systems Integration, At Copenhagen; Mar. 2015; www.researchgate.net/publication/273351261.

* cited by examiner

*Primary Examiner* — Michael S McNally
(74) *Attorney, Agent, or Firm* — Schmeiser, Olsen & Watts LLP

(57) ABSTRACT

Provided is an apparatus (TFDC) for operating a software-configured processing unit (SDS) for a device, in particular a field device (TFD), wherein the apparatus, according to a prescribed and/or prescribable architecture, includes at least one processor (CPU) and a number of hardware units, having: a security unit (IOS; MS) configured to cause a change in the arrangement of the data bit sequence of at least one data stream provided and/or routed to the processing unit (SDS) to protect the hardware units from manipulation. The processing unit is trustworthy, i.e., is protected from manipulation and attack from the outside. The data stream arrives at the device. A "number" here and above denotes a number of one or more.

21 Claims, 2 Drawing Sheets

Figure 1:
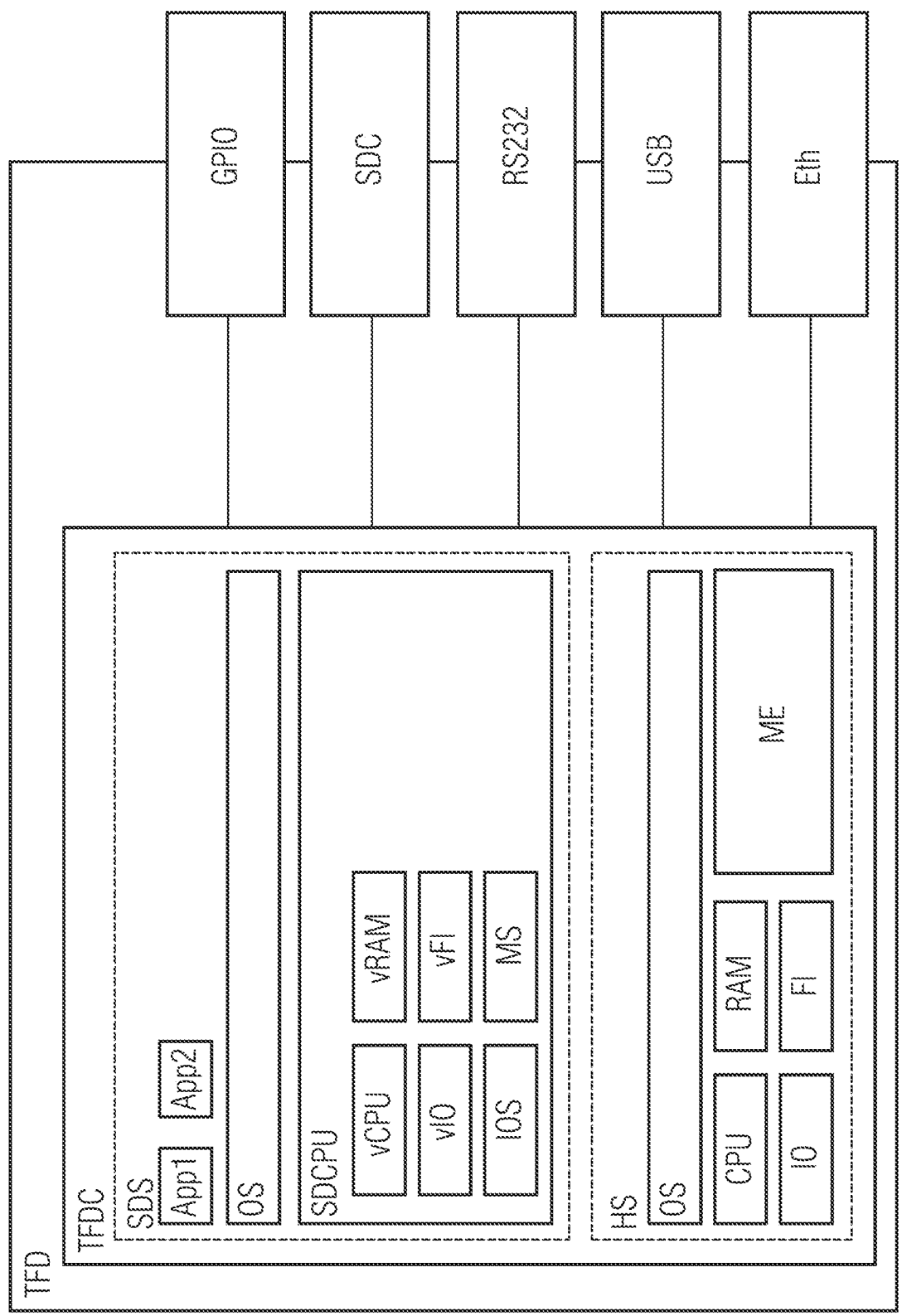

APPARATUS AND METHOD FOR OPERATING A SOFTWARE-CONFIGURED PROCESSING UNIT FOR A DEVICE

CROSS-REFERENCE TO RELATED APPLICATION

This application claims priority to European Application No. 18183287.4, having a filing date of Jul. 13, 2018, the entire contents of which are hereby incorporated by reference.

FIELD OF TECHNOLOGY

The following relates to an apparatus and a method for operating a software-configured processing unit for a device, in particular a field device.

BACKGROUND

There is a need to use IT security mechanisms to protect products, for example devices (e.g. control units/devices, Internet of Things (IoT) devices, embedded devices), device components or software components, from manipulation and/or reverse engineering. Cryptographic IT security mechanisms are already in use for example in smart devices, for example in devices of the Internet of Things (IoT), from cyberphysical systems, from automation systems or from manufacturing systems, of operating technology and from other installations.

Integrated semiconductor chips and in particular processors (CPUs) are the basis for control devices used in critical infrastructures. The problem that a hardware CPU can have intentional weaknesses (backdoor, hardware trojan) is known generally. Additionally, a hardware implementation generally likewise inadvertently has weaknesses such as software.

For an industrial application of CPUs, in particular the integrity of the CPU is of great importance. This is intended to ensure that the CPU has no weakness resulting in a malfunction or destruction (kill switch) during operative service. Specifically attacks reaching the CPU via external data (e.g. network communication) and leading to destruction are relevant in this case.

The term "security" within the context of the present description relates essentially to the security or protection, confidentiality and/or integrity of data and the transmission thereof and also security, confidentiality and/or integrity when accessing applicable data. The authentication for data transmissions or for data access is also covered by the term "security", as used within the context of the present description. A module may in this case be embodied as a hardware and/or functional unit that can have its software and/or firmware configured. The function can be performed for example by means of a processor and/or a memory unit for storing program commands.

Protected against manipulation goes beyond the term "security" in the present description. This involves not only the aforementioned cryptographic or security methods being used but also the data transmission being reliably safeguarded against attacks or unauthorized access from the outside.

Industrial devices, e.g. control devices, field devices, IoT devices or IoT gateways, use a plurality of cryptographic keys, e.g. in order to authenticate themselves, in order to protect integrity of stored data and program code, in order to check and decrypt firmware updates and in order to protect the integrity and if need be the confidentiality of project-planning and configuration data. In order to transmit data, in particular control data, the aforementioned devices can be equipped with a data interface that can be wired or in the form of and configured as a wireless interface, e.g. a WLAN, mobile radio (e.g. UMTS, LTE, 5G), Bluetooth or NFC (near field communication) interface. Using this data interface, the device can be connected to a network and can communicate with other devices.

Further wireless or radio-based transmission techniques are usable in this case (e.g. safety over WLAN such as e.g. ProfiSafe, WiMax, Cloud Robotics, GSM, UMTS, LTE, 5G, vehicle-2-X communication for autonomous vehicles or autonomous driving, radio-based train protection ETCS). Position information (PVT: position, velocity, time) used for a control function of the device can also be received in radio-based fashion using a satellite navigation system (GPS, Galileo, Beidou, Glonass).

It is possible to realize a CPU as a soft CPU on a programmable digital chip (FPGA). In practice, however, design libraries of a soft CPU are usually likewise used in this case, so that, in this case too, the user of the design cannot rule out a weakness being included in the design.

There are furthermore simulators/emulators possible in order to simulate a single CPU or an entire computer system on another computer system. By way of example, it is reported that Microsoft is working on an x86 emulation for ARM-based computers in order to be able to execute general Windows programs even without an x86 CPU. Simulators/emulators are conceivable that are sometimes freely available (e.g. RISC V simulator rv8). Furthermore, it is possible to execute a CPU simulator in a web browser and to execute a Linux system in the simulator. It is conceivable for CPUs to have what are known as management engines that can be used to manage a computer system independently of the installed operating system.

In the safety sphere, the document by Martin Süßkraut, Jörg Kaienburg: Safety-Critical Smart Systems with Software Coded Processing, Smart Systems Integration, Copenhagen, 2015, discloses software coded processing.

There is a need to provide trustworthy processors, in particular for embedded industrial devices and systems.

SUMMARY

An aspect relates to methods and apparatuses or devices or units in particular in the industrial sphere in comparison with the aforementioned prior art.

The embodiments claim an apparatus for operating a software-configured processing unit for a device, in particular a field device, wherein the apparatus, according to a prescribed and/or prescribable architecture, comprises at least one processor and a number of hardware units, having: a security unit configured to cause or perform a change in the arrangement of the data bit sequence (n) of at least one data stream provided and/or routed to the processing unit to protect the hardware units from manipulation (from the outside).

The processing unit is trustworthy, i.e. is protected from manipulation and attack from the outside. The data stream arrives at the device.

A "number" here and below denotes a number of one or more.

The embodiments follow the approach of executing software (in particular control code of an industrial control system) on standard computer hardware with improved trustworthiness (trusted execution on untrusted hardware platforms).

The input and output data (I/O data) in relation to the outside world are transmitted via a kind of separate data lock-keeper. This has the advantage that the input/output interfaces of the processor are not accessible from the outside. This realizes a protected data path to and from the software-configured processing unit, so that access to the actual hardware or hardware units is prevented from the outside. The data are transmitted to the data lock-keeper in "randomized" (i.e. randomly arranged) fashion via the data path (scrambled, encrypted), so that an outsider has no control over what data a hardware interface of the processor actually gets to see. It is ensured with a high level of reliability that external data do not reach the "science" (hardware). This prevents or at least hampers any weakness present in the processor hardware from being able to be exploited from the outside by an attacker.

One development of embodiments of the invention provides for the processing unit to be able to reconstruct the arrangement of the data bit sequence from the altered arrangement of the data bit sequence to the extent that the data bits of the reconstructed data bit sequence can be processed by the processor with support from the hardware units.

One development of embodiments of the invention provides for a control unit to be configured to take the software configuring the processing unit (virtually, emulation) as a basis, and to use the prescribed and/or prescribable architecture, for controlling routing or transmitting of the reconstructed data bit sequences between the processor and the hardware units.

"Software-configured" within the context of embodiments of the invention means that the units of the processing unit are virtual, i.e. software-configured, or the executable software code or program code forms the one or more units. A control unit of the processing unit can be in the form of an emulator. An emulator in the present case is a program that can emulate a computer and thus allows software for this computer, in the present case the apparatus, to be used on a computer (in the present case: software-defined system) having a different architecture.

"Software-defined" is in particular intended to be understood to mean that the functionality of the processing unit formed from units (=architecture) is not firmly prescribed for these units. The association of the functionality with a unit is defined or stipulated by software.

Similarly, in the case of software hardening measures, a hardened software-defined or virtual CPU can thus be realized. Even if the hardware CPU (or further chips of the system) used should have weaknesses in the hardware, exploitation of the weaknesses by an attacker is hampered.

One development of embodiments of the invention provides for the alteration of the arrangement of the data bit sequence (e.g. from Ethernet) to be achievable by means of encapsulation of data bits from the data bit sequence into multiple (IP) data packets (of the same or variable length).

One development of embodiments of the invention provides for the alteration of the arrangement of the data bit sequence to be achieved by means of a delayed (prescribably) transmission of the data packets. The timing behavior of the external interface (input/output interface etc.) can accordingly be made random.

One development of embodiments of the invention provides for the order of the data packets to have been scrambled or to be scrambled (according to the random principle).

One development of embodiments of the invention provides for the data bit sequence with its arrangement altered to form a secure data path.

One development of embodiments of the invention provides for the alteration of the arrangement of the data bit sequence to have been or to be caused or to be able to be caused by a cryptographic encryption.

One development of embodiments of the invention provides for the control unit also to have a memory unit configured to store data from the altered data bit sequence.

One development of embodiments of the invention provides for the data to be able to be stored in the memory unit at random (in respect of location, time) (randomized).

A further aspect of embodiments of the invention is a method for operating a software-configured processing unit for a device, in particular a field device, that has an apparatus having at least one processor, according to a prescribed and/or prescribable architecture, and having a number of hardware units, having the following step:

altering the arrangement of the data bit sequence(s) of at least one data stream provided and/or routed to the processing unit to protect the hardware units from manipulation (from the outside).

The embodiments are in particular advantageously usable when the primary aim of protection relates to the correct functionality (integrity). This is the case in particular in industrial applications, e.g. in the case of critical infrastructures. Furthermore, embodiments of the invention achieve the effect that additional functions of a processor or hardware CPU, which are referred to e.g. as a management engine, which can be used to start and manage a computer system independently of the operating system actually present, are reliably unreachable. This is in particular advantageous because commercially available CPUs have additional functions of this kind that cannot be deactivated, or at least cannot be deactivated completely, by the user, however.

In addition, there is provision for a computer program product (non-transitory computer readable storage medium having instructions, which when executed by a processor, perform actions) comprising program code that can be executed by at least one processor and that causes the at least one processor to perform the (operating) method according to embodiments of the invention and the embodiments of the method. The computer program can run on a device or unit of the type cited above or can be stored as a computer program product on a computer-readable medium.

Additionally, a variant of the computer program (product) having program commands for configuring a fabrication device, for example a 3D printer, can be a computer system or a production machine suitable for fabricating processors and/or devices.

The method and computer program (products) can be in the form corresponding to the developments/embodiments of the aforementioned apparatus and the developments/embodiments thereof.

The properties features and advantages of embodiments of this invention that are described above and the way in which they are achieved will become clearer and more distinctly comprehensible in connection with the description of the exemplary embodiments that follows, these being explained more specifically in connection with the FIGURE, in which, in a schematic depiction:

BRIEF DESCRIPTION

Figure 2:
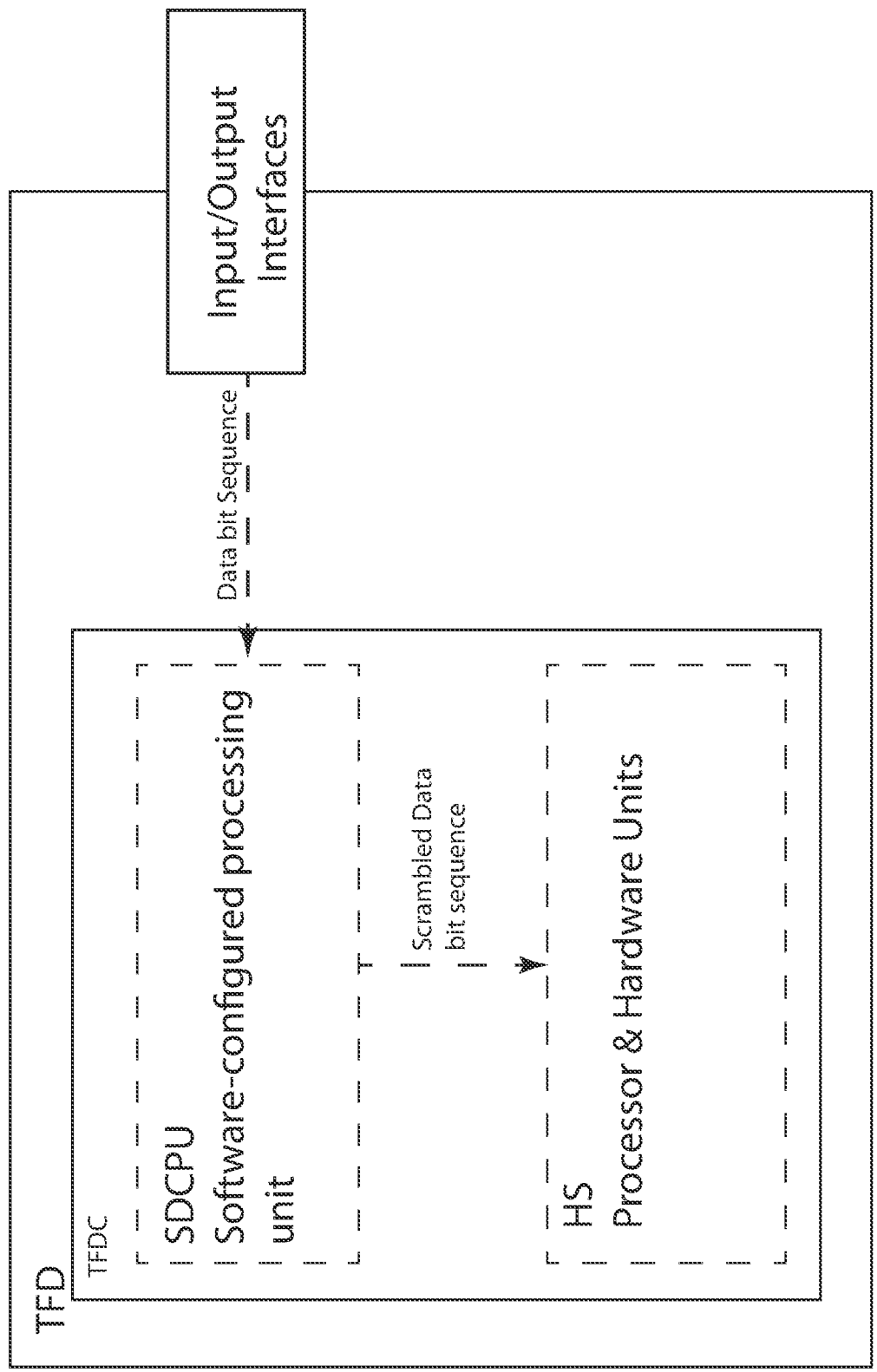

Some of the embodiments will be described in detail, with references to the following FIGURE, wherein like designations denote like members, wherein:

FIG. 1 shows an apparatus (TFDC) for operating a software-configured processing unit (SDS) for a device according to an embodiment of the invention; and FIG. 2 shows an apparatus and a data path from input/output interfaces, to a software-configured processing unit, to a processor and hardware units according to an embodiment of the invention.

DETAILED DESCRIPTION

FIG. 1 shows (physical, externally accessible) input/output interfaces, e.g. a GPIO port GPIO, an SD card interface SDC, RS232, USB, Eth, which each use a scrambling unit IOS to receive data between the "data lockkeeper" and a software-configured processing unit SDS, comprising a virtual CPU vCPU, a virtual main memory vRAM, a virtual input/output interface vIO and a virtual flash memory vFl and also an associated operating system OS and possibly applications App1, App2 based thereon, in randomized fashion (arranged at random and/or stored at random) via the data path (scrambled, encrypted). Also, data for the or in the memories vRAM and vFl can be stored at random or in scrambled fashion by a memory scrambling unit MS. Therefore, an outsider has no control over what data a hardware interface of the hardware CPU CPU actually gets to see. It is ensured with a high level of reliability that external data do not reach the "science" (hardware). The scrambling unit IOS can also be referred to as a security unit. If need be together with the memory scrambling unit MS, this scrambling unit can form a security unit. FIG. 2 shows a streamlined schematic depicting a data path from the input/output interfaces. A data bit sequence is transmitted from the input/output devices to the software-configured processing unit. The software-configured processing unit randomizes/scrambles the data bit sequence and the randomized/scrambled data bit sequence is provided to the hardware processor and hardware units.

A scrambling unit IOS can use a random value as a scrambling parameter. Multiple scrambling components IOS can use the same scrambling parameter, different scrambling parameters or a scrambling parameter specific to each of the IOS components. The scrambling parameters can be available to the software-defined CPU SDCPU in order to be able to reverse the scrambling. However, it is also possible for the software-defined CPU SDCPU to be configured so as to process the scrambled data without reversing the scrambling. This is in particular possible if the data are recoded on the basis of a scrambling parameter during the scrambling (e.g. by virtue of a value being added to or multiplied by the scrambling parameter). A scrambling parameter can be ascertained by a random number generator. A scrambling parameter can be set or updated e.g. during startup, during maintenance, during a device start (boot) and/or repeatedly in the course of operation.

During scrambling, a data value can be e.g. encrypted, with the scrambling parameter being used as a cryptographic key; it can be XORed (Exclusive ORed) with a scrambling parameter on a bit-by-bit basis. The bit length of an input/output parameter can remain unchanged in this case. It is likewise possible for the bit length to become greater, in particular to be doubled or tripled, during scrambling, i.e. for the data to be coded redundantly, e.g. arithmetically coded on the basis of the scrambling parameter. This can simplify processing of scrambled data by a software-defined CPU SDCPU.

The embodiments are based on a hardware trojan being activated by specific conditions such as sensor values or input patterns. An architecture for a CPU or a CPU-based system is therefore proposed in which the external input data or sensor data do not reach the actual hardware, but only reach a software-defined CPU simulation. As a result, any weaknesses present in the underlying hardware CPU cannot be activated or exploited at least from the outside (in particular via a network interface). The program code (firmware, operating system, application program code) of a control system or control device TFD (e.g. field device, electronic control unit, programmable logic controller, industrial IoT device) is in this case executed in a simulation/emulation that is executed on the hardware CPU. This means that a control unit SDCPU produced as a CPU simulator or a system emulator that is executed on the core part TFDC of the control device TFD executes the control program code. The apparatus TFDC of the control device TFD that is designed as a core part comprises the software-configured processing unit SDS and also a hardware system or unit HS, according to a prescribed or prescribable hardware architecture, that comprises at least the hardware processor or hardware CPU and a further or multiple hardware unit(s) e.g. main memory RAM, flash memory Fl and an input/output interface IO and also an operating system OS.

The CPU on which the critical program code of the control system is executed is thus a type of software-defined CPU that is identical to or at least comparable with the control unit SDCPU in the FIGURE. This has the advantage that weaknesses of the hardware CPU are more difficult or impossible to exploit by means of the program code. It is also possible to update the software-defined CPU possibly by updating the simulator/emulator—if required—without having to swap the actual hardware. By way of example, a virtual X86 CPU can be emulated on RISC V hardware CPUs (or conversely an RISC V CPU is emulated on a hardware X86 CPU).

Also, the work data of the control unit SDCPU (e.g. registers, caches, RAM memory, flash memory) are furthermore arranged at random, differently on every system start or in every SDCPU entity. This further hampers exploitation of a weakness (hardware trojan) of the hardware CPU used. An attacker has no control over what data the hardware CPU actually gets to see. For this purpose, the SDCPU emulator arranges at random or scrambles the work data kept in the hardware main memory and hardware registers in the hardware system. These work data can be received and sent via one data path, so that these received data may already have (had) their data bit sequence altered, and/or they are sent with their data bit sequence altered or arranged at random.

The alteration of the arrangement of the data bit sequence (via network interface e.g. Ethernet) can be achieved by means of encapsulation of data bits from the data bit sequence into multiple (IP) data packets (of the same or variable length). The data bit sequence with its arrangement altered can form a secure data path. The alteration of the arrangement of the data bit sequence can be caused by a cryptographic encryption.

The aforementioned scrambling unit IOS ensures that the data that are received from the outside or sent to the outside are not available on the hardware system or on an interface of the hardware system in plain text (and thus cannot feasibly trigger a hardware trojan at those locations). The data are not put into a plain text form until on the software level of the control unit SDCPU at runtime. Additionally, the memory content in the virtual memory vRAM, vFl is likewise scrambled in this case. Instead of "scrambling", e.g. simple XORing with a random value or addition or multiplication to/by a random value, a cryptographic encryption (e.g. on the basis of AES) can be used. This is not used primarily to protect the confidentiality or integrity of the transmitted data in the present case, but rather serves to ensure that the data are not directly accessible from the outside and that particular plain text data are provided to the hardware CPU directly. In particular, this can prevent particular plain text data from reaching the hardware CPU via a network interface.

Furthermore, the scrambling/encrypting of the input/output interfaces reliably achieves the effect that a management engine ME possibly present in the hardware system (i.e. the hardware CPU) is not addressable.

Furthermore, it is possible for the data lock-keeper to make the timing behavior of the external interface random. This hampers the use of timing effects to infer the execution in the control unit SDCPU (side channel).

It is likewise possible for the timing behavior to be made deterministic by the data lock-keeper, independently of the actual execution period of the control unit SDCPU. For this purpose, an outgoing response message associated with a received request message can be output at an exact time determined by the data lock-keeper. The response obtained from the SDCPU is buffer-stored and output externally only at the ascertained time. This embodiment also hampers or prevents the use of timing effects to be able to infer the execution in the control unit SDCPU.

In a further embodiment, the output data can be delayed at random or passed to the outside only at particular times (independently of the time of input data).

Furthermore, additional security measures can be provided for in the software-defined CPU. Specific security functions, in general proprietary to the respective hardware chip manufacturer, such as Secure Boot, can easily be used as a result. It is also possible for additional runtime integrity monitoring operations to be realized on a low CPU-adjacent level independently of the actual IC hardware. In other words, a software-defined CPU of this kind can be used to flexibly realize security measures that are not available or are not feasibly realizable in hardware:

Secure Boot independently of hardware CPU security functions: the control unit SDCPU is presented with a key/hash value in order to restrict loading on trustworthy software (a Secure Boot for the SDCPU can thus be realized independently of an HW-specific Security Boot for the hardware CPU). This is advantageous because a practical implementation of Secure Boot on a hardware CPU is frequently complex and since this requires specific tools and a security documentation that is not generally accessible.

Attestation of the program code actually executed at present. This allows an outsider to check the runtime integrity of the control unit SDCPU, i.e. to check what software is executed on the control unit. This goes beyond an attestation of a TPM (trusted platform module) on PCs (personal computers), since it is not confirmed what software has been loaded, but rather what software is actually executed. If the loaded software is manipulated at runtime, e.g. by exploiting a weakness of the software, this can be detected on the control unit SDCPU.

Runtime monitoring of internal states of the software-defined CPU: this also allows internal state data (e.g. registers) of the software-defined CPU to be monitored from the outside, which is not possible—if at all, only in complex fashion—in the case of a conventional hardware CPU during operative service.

Virtual "fingerprinting" of the executed program code, without actually having to measure the physical effect (current consumption profile, electromagnetic radiation). This allows integrity monitoring to be realized that evaluates simulated physical side effects of the software-defined CPU (i.e. not the actual physical current consumption profile/electromagnetic radiation of the software-defined CPU, but rather information simulated by the software-defined CPU, and available only in digitally virtual fashion, about the simulated physical effect).

Furthermore, it is possible to execute the same software-defined CPU twice or repeatedly on different hardware CPUs. The output data and/or the internal state data of the software-defined CPU entities can be checked for concordance.

The processes or method sequences described above can be implemented on the basis of instructions that are present on computer-readable storage media or in volatile computer memories (referred to below collectively as computer-readable memories). Computer-readable memories are for example volatile memories such as caches, buffers or RAM and also nonvolatile memories such as removable data carriers, hard disks, etc.

The functions or steps described above may in this instance be available in the form of at least one set of instructions in/on a computer-readable memory. The functions or steps in this instance are not tied to one particular set of instructions or to one particular form of sets of instructions or to one particular storage medium or to one particular processor or to particular execution schemes and can be executed by software, firmware, microcode, hardware, processors, integrated circuits, etc., operating on their own or in any combination. In this instance, a wide variety of processing strategies can be used, for example serial processing by a single processor or multiprocessing or multitasking or parallel processing, etc.

The instructions may be stored in local memories, but it is also possible for the instructions to be stored on a remote system and to be accessed via a network.

The term "processor", "central signal processing", "control unit" or "data evaluation means", as used in the present case, comprises processing means in the broadest sense, that is to say for example servers, general purpose processors, graphics processors, digital signal processors, application-specific integrated circuits (ASICs), programmable logic circuits such as FPGAs, discrete analog or digital circuits and any combinations of these, including all other processing means known to a person skilled in the art or developed in future. Processors can in this instance consist of one or more apparatuses or devices or units. If a processor consists of multiple apparatuses, these may be designed or configured for the parallel or sequential processing or execution of instructions.

Although the present invention has been disclosed in the form of preferred embodiments and variations thereon, it will be understood that numerous additional modifications and variations could be made thereto without departing from the scope of the invention For the sake of clarity, it is to be understood that the use of "a" or "an" throughout this application does not exclude a plurality, and "comprising" does not exclude other steps or elements.

The invention claimed is:

1. An apparatus for operating a device, wherein the device is a field device, wherein the apparatus comprises:
   at least one processor, a software-configured processing unit, and a number of hardware units,
   wherein the software-configured processing unit is configured to cause a change in the arrangement of the data bit sequence of at least one data stream which is at least one of provided and routed from input/output interfaces to the processing unit to protect the hardware units from manipulation, wherein the software-configured processing is arranged between the input/output interfaces and the at least one processor to protect the hardware units from manipulation.

2. The apparatus as claimed in claim 1, wherein the data stream is intended for at least one of processing by the processor and storage in one or more hardware units.

3. The apparatus as claimed in claim 1, wherein the processing unit can reconstruct the arrangement of the data bit sequence from the altered arrangement of the data bit sequence to the extent that the data bits of the reconstructed data bit sequence can be processed by the processor with support from the hardware units.

4. The apparatus as claimed in claim 3, wherein a control unit is configured to take the software configuring the processing unit as a basis, and to use at least one of the prescribed and prescribable architecture, for controlling routing of the reconstructed data bit sequences between the processor and the hardware units.

5. The apparatus as claimed in claim 1, wherein the alteration of the arrangement of the data bit sequence is achievable by encapsulation of data bits from the data bit sequence into multiple data packets.

6. The apparatus as claimed in claim 5, wherein the alteration of the arrangement of the data bit sequence is achieved by a delayed transmission of the data packets.

7. The apparatus as claimed in claim 5, wherein the order of the data packets is scrambled.

8. The apparatus as claimed in claim 1, wherein the data bit sequence with its arrangement altered forms a secure data path.

9. The apparatus as claimed in claim 1, wherein the alteration of the arrangement of the data bit sequence is caused or can be caused by a cryptographic encryption.

10. The apparatus as claimed in claim 1, wherein the control unit also has a memory unit configured to store data from the altered data bit sequence.

11. The apparatus as claimed in claim 10, wherein the data can be stored in the memory unit at random.

12. A method for protecting a device from attack, wherein the device is a field device, that has an apparatus having at least one processor, and having a number of hardware units, the method comprising:
   providing a software-configured processing device, wherein the software-configured processing device is arranged between input/output interfaces and the at least one processor, and
   altering the arrangement of at least one data bit sequence of at least one data stream which is provided and/or routed to the processing unit to protect the hardware units from manipulation.

13. The method as claimed in claim 12, wherein the data stream is intended for processing by at least one of the processor and for storage in one or more hardware units.

14. The method as claimed in claim 12, wherein reconstructing the arrangement of the data bit sequence from the altered arrangement of the data bit sequence to the extent that the data bits of the reconstructed data bit sequence are processed by the processor with support from the hardware units.

15. The method as claimed in claim 14, wherein the software configuring the processing unit is taken as a basis, and the at least one of prescribed and prescribable architecture is used, for controlling routing of the reconstructed data bit sequences between the processor and the hardware units.

16. The method as claimed in claim 12, wherein the alteration of the arrangement of the data bit sequence is achieved by encapsulation of data bits from the data bit sequence into multiple data packets.

17. The method as claimed in claim 16, wherein the alteration of the arrangement of the data bit sequence is achieved by a delayed transmission of the data packets.

18. The method as claimed in claim 16, wherein the order of the data packets is scrambled.

19. The method as claimed in claim 12, wherein the data bit sequence with its arrangement altered forms a secure data path.

20. The method as claimed in claim 12, further comprising: providing a control unit, wherein the control unit has a memory unit configured to store data from the altered data bit sequence.

21. The method as claimed in claim 20, wherein the data are stored in the memory unit at random.

* * * * *